United States Patent [19]

Truty et al.

[11] Patent Number: 5,003,148

[45] Date of Patent: Mar. 26, 1991

[54] METHOD OF THREADING ELECTRODE THROUGH EDM GUIDE

[75] Inventors: Thomas J. Truty, South Barrington, Ill.; William H. Schmidt, Fort Wayne, Ind.

[73] Assignee: Fort Wayne Wire Die, Inc., Fort Wayne, Ind.

[21] Appl. No.: 255,782

[22] Filed: Oct. 11, 1988

[51] Int. Cl.[5] .............................................. B23H 7/10
[52] U.S. Cl. .............................. 219/69.12; 219/69.17
[58] Field of Search ............... 219/69 W, 69 D, 69.12, 219/69.14, 69.17; 204/206

[56] References Cited

U.S. PATENT DOCUMENTS

| | | | |
|---|---|---|---|
| 3,775,580 | 11/1973 | Scherbaum | 219/69 E |
| 4,539,459 | 9/1985 | Yamagata | 219/69 W |
| 4,564,431 | 1/1986 | Miyano | 219/69 W |
| 4,608,478 | 8/1986 | Aso et al. | 219/69 W |
| 4,613,740 | 9/1986 | Ichikawa | 219/69 W |
| 4,698,476 | 10/1987 | Yamamoto et al. | 219/69 W |
| 4,803,328 | 2/1989 | Obara | 219/69 W |
| 4,833,291 | 5/1989 | Aso et al. | 219/69.12 |

FOREIGN PATENT DOCUMENTS

| | | | |
|---|---|---|---|
| 60-249531 | 12/1985 | Japan | 219/69 W |
| 173818 | 8/1986 | Japan | 219/69.12 |
| 8703521 | 6/1987 | PCT Int'l Appl. | 219/69.12 |

Primary Examiner—Geoffrey S. Evans
Attorney, Agent, or Firm—George Pappas

[57] ABSTRACT

A wire guiding device for electrical discharge machines (EDM) for easing the threading of wire through the wire guiding assembly. The wire guiding device includes a body wherethrough a longitudinal wire hole is defined having first and second openings. A cavity is located in the body and communicates with the wire hole along a longitudinal communication portion. The cavity is channel-shaped including a planar valley portion and two walls. The planar valley portion intersects the wire hole and forms the longitudinal communication portion and also forms an arcuate groove along the valley portion and in the body. A wear-resistant member is fixed in a bore near one opening of the wire hole and a non-conductive cap is fixed thereover and shields the wear-resistant member and the wire guiding device from electroerosion. A liquid retention chamber is attached to the wire guiding assembly and at least partially surrounds the wire guiding device and has a hole substantially coaxially arranged with the wire hole. Pressurized liquid within the chamber discharges through the chamber hole and the wire is also received through the hole. A door is provided on the chamber and is selectively detachably attached thereto and provides access to the interior of the chamber and to the cavity.

4 Claims, 4 Drawing Sheets

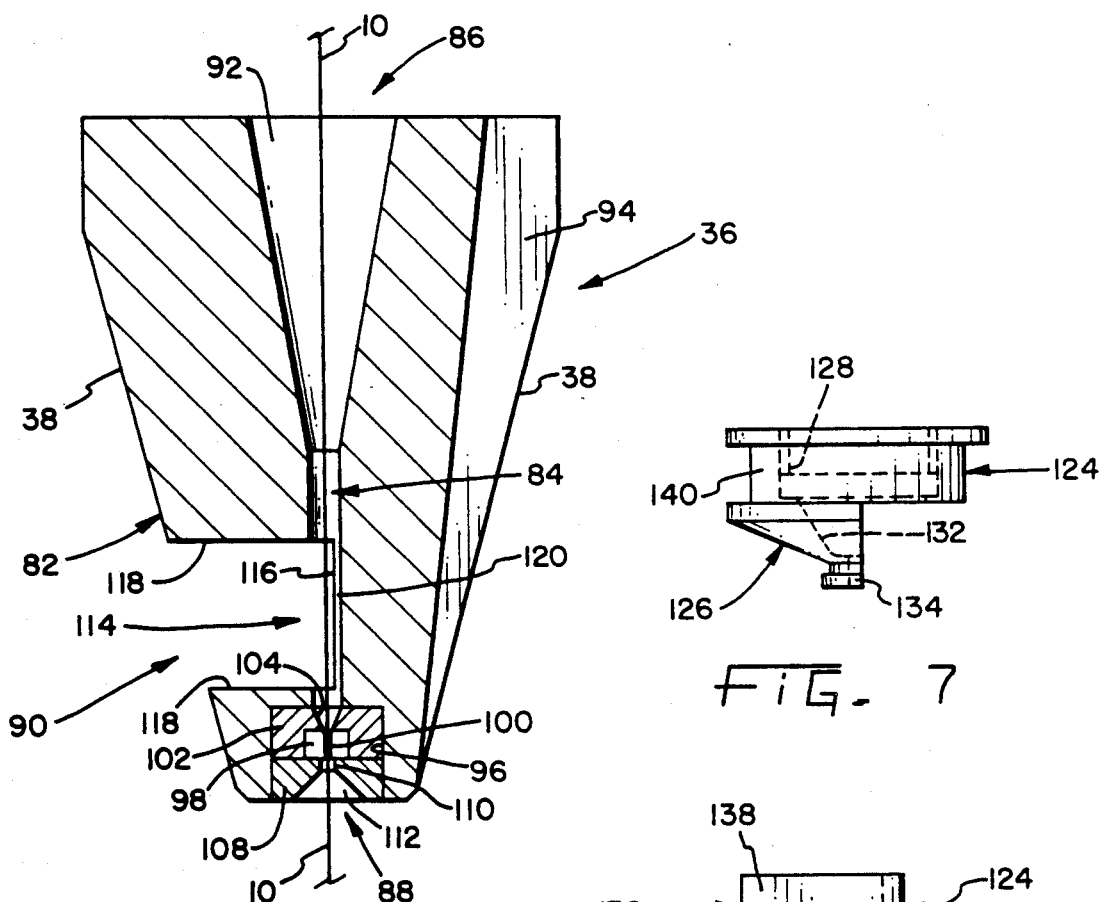
FIG. 4
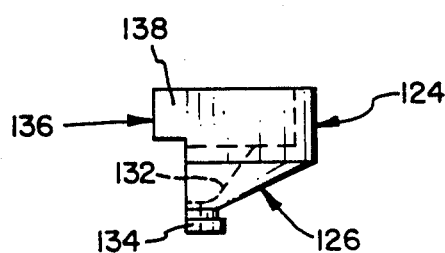
FIG. 7
FIG. 8
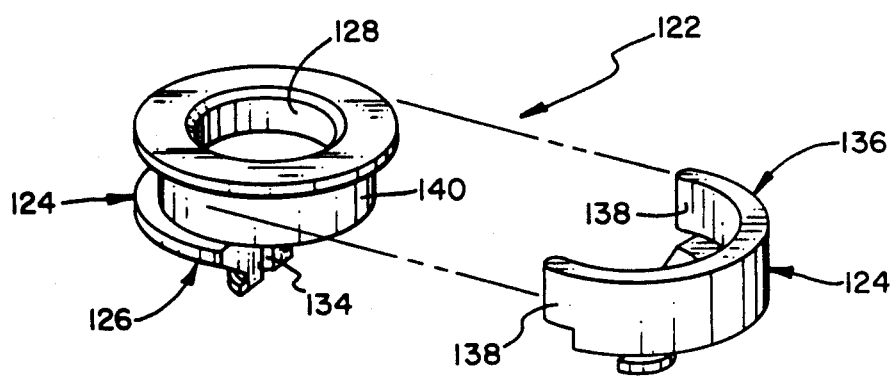
FIG. 6

METHOD OF THREADING ELECTRODE THROUGH EDM GUIDE

BACKGROUND OF THE INVENTION

The present invention relates to electrical discharge machines (EDM) and, more specifically, to a wire guiding device for use in electrical discharge machines whereby wire of relatively small diameters used by the electrical discharge machines may be more readily and easily threaded through the wire guiding device.

EDM machines using a wire electrode are presently commonly used for making precise cuts on various materials such as metals and cutting the metal or workpiece to a given desired shape or configuration. The wire is drawn through two wire guides and the workpiece is situated between the two guides. The wire and workpiece are placed at different electrical potentials and a controlled electric spark traveling from the wire to the workpiece causes the workpiece to be eroded and cut in a predetermined desired shape or configuration.

The guides through which the wire travels are connected to arms that selectively situate the wire in position for cutting the desired shapes. Furthermore, the guides often are located within an assembly including a preguide, a pickup for placing an electrical potential on the wire and various gaps for receiving deionized water or a liquid for cooling the guide assembly and flushing the workpiece.

When threading the wire through the guide assembly, such as, for example, if the wire were to break during operation, the operator must either disassemble the wire guiding assembly and thread the wire therethrough or attempt to thread the wire while the assembly is intact. As can be appreciated, disassembling the wire guide assembly is extremely burdensome, time consuming, and undesirable. Accordingly, the preferred method is to attempt to thread the wire by pushing the same through the wire guide assembly. However, this threading process is also quite often burdensome and time consuming because the wire quite often becomes caught within the various components of the wire guide assembly and the wire is not easily threaded therethrough. This is especially true when the wire must travel, for example, through a preguide and thereafter an off center electrical pickup and then, finally, through a precise guide hole such as, for example, in a diamond. This threading process is further laborious when the wire must, at the end, be threaded through a diamond hole approximately only 0.0002 inch greater in diameter than the wire itself. Further yet, as the wire is decreased in diameter size, for example, less than 0.004 inch, the longitudinal stiffness of the wire over the distance that it must be threaded is significantly reduced. The small diameter wire, in fact, has a tendency to curl and is realistically and practically impossible to thread through the final diamond wire guide hole after it has been pushed through the preguide and the off center electrical pickup. This problem is further enhanced in view of the fact that thin or small diameter wire has a greater tendency to break during operation and, thus, a long threading operation means substantially more down time of the electrical discharge machine translating to inefficiency and greater production costs.

SUMMARY OF THE INVENTION

It is the principle object of the present invention to overcome the above-discussed disadvantages associated with threading EDM wire guides used in electrical discharge machines.

A wire guiding device, according to the present invention, includes a cavity in the body of the wire guiding device communicating with the wire hole which extends longitudinally through the body and receives the wire therethrough. In operation, the wire is pushed or threaded through, for example, the preguide and the off center electrical pickup and the first opening of the wire hole and through a portion of the wire hole until the wire reaches the cavity. Thereafter, the wire is grasped by the operator, for example, with tweezers, and is threaded through the remaining portion of the wire hole and through the more exact substantially small wear-resistant member or diamond hole and out through the second opening of the wire hole and out of the body. In this fashion, a small diameter wire such as one smaller than 0.004 inch that would have, in general, curled and become caught and not readily received through the diamond hole, can be easily grasped with tweezers and threaded by the operator substantially quickly and efficiently.

The wear-resistant member or diamond is retained or fixed in an insert made of sintered metal. The sintered metal insert is received in a bore at one end of the body and is fixed therein. The insert includes a truncated conical portion converging toward the diamond which also includes a truncated conical portion converging toward the diamond hole. A non-conductive cap is also fixed in the bore at the end of the body and substantially covers the diamond and insert. The cap has a hole substantially coaxial with the wire hole and, further, has a truncated conical portion converging towards the cap hole. The cap is made of sapphire, ruby, and/or a ceramic material and serves to shield the insert, diamond and the end of the body from electroerosion.

The cavity communicates with the longitudinal wire hole substantially along a longitudinal portion of the wire hole thus making it easier for the operator to grasp and thread the wire through the diamond hole. Furthermore, the cavity is channel-shaped having a bottom planar valley portion and two walls and the wire hole extends longitudinally substantially parallel to the planar valley. The wire hole is intersected by the planar valley, thus, forming the longitudinal communication portion between the wire hole and the cavity and, further, forming an elongate arcuate groove on the planar valley and in the body. The groove is formed on one side of the longitudinal axis of the wire hole. The groove acts as a locating reference or channel to funnel the wire down to the diamond hole and, also, functions as a locating reference for the operator's tweezer tips or ends. The groove, thus, further aids in more quickly and efficiently threading the wire through the wire guiding device.

A liquid retention chamber is provided at the end of the wire guide assembly and at least partially surrounds the wire guide device and is adapted to retain therein a pressurized liquid such as deionized water. The liquid retention chamber includes a truncated conical portion converging to a hole that is substantially coaxially arranged with the wire hole and receives the wire and discharging liquid or deionized water therethrough. So as to further aid and decrease the time needed for threading the wire guiding device, a door is provided on the liquid retention chamber for opening the chamber and providing access to the interior thereof and to the wire guiding device cavity. The door is selectively detachably attached to the liquid retention chamber and, thus, after the threading operation, the door is merely reattached to the chamber and the EDM wire guiding device and assembly is ready for operation.

In one form thereof, the present invention is directed to a wire guiding device for an electrical discharge machine. The wire guiding device includes a body wherethrough a wire hole extends and has a first opening at one end and a second opening at the other end. A cavity is provided in the body and communicates with the hole for obtaining access to the wire hole and threading a wire through the wire hole between the wire hole openings.

In one form thereof, the present invention is directed to a method of threading a wire through a wire guiding device of an electrical discharge machine. The wire guiding device includes a body, a wire hole extending through the body and having a first opening at one end and a second opening at the other end, and a cavity in the body in communication with the wire hole. The method includes the steps of inserting an end of the wire through the first opening of the wire hole and through a portion of the wire hole to the cavity communicating with the wire hole. Thereafter, the wire is grasped through the cavity and the wire is threaded from the cavity through the remaining portion of the wire hole and out of the device through the second opening of the wire hole.

BRIEF DESCRIPTION OF THE DRAWINGS

The above-mentioned and other features and objects of this invention and the manner of obtaining them will become more apparent and the invention itself will be better understood by reference to the following description of an embodiment of the invention, taken in conjunction with the accompanying drawings wherein:

FIG. 4 is a cross-sectional view of the wire guiding device shown in FIG. 3 and taken along line 4—4;

FIG. 6 is an exploded perspective view of the liquid retention chamber used in conjunction with the wire guiding device shown in FIG. 2;

FIG. 7 is a side elevational view of a portion of the liquid retention chamber shown in FIG. 2;

FIG. 8 is a side elevational view of the door used in conjunction with the liquid retention chamber for detachably attaching thereto and forming a part thereof.

Corresponding reference characters indicate corresponding parts throughout the several views of the drawings.

The exemplifications set out herein illustrate a preferred embodiment of the invention in one form thereof and such exemplifications are not to be construed as limiting the scope of the disclosure or the scope of the invention in any manner.

DETAILED DESCRIPTION OF A SPECIFIC EMBODIMENT

Figure 1:
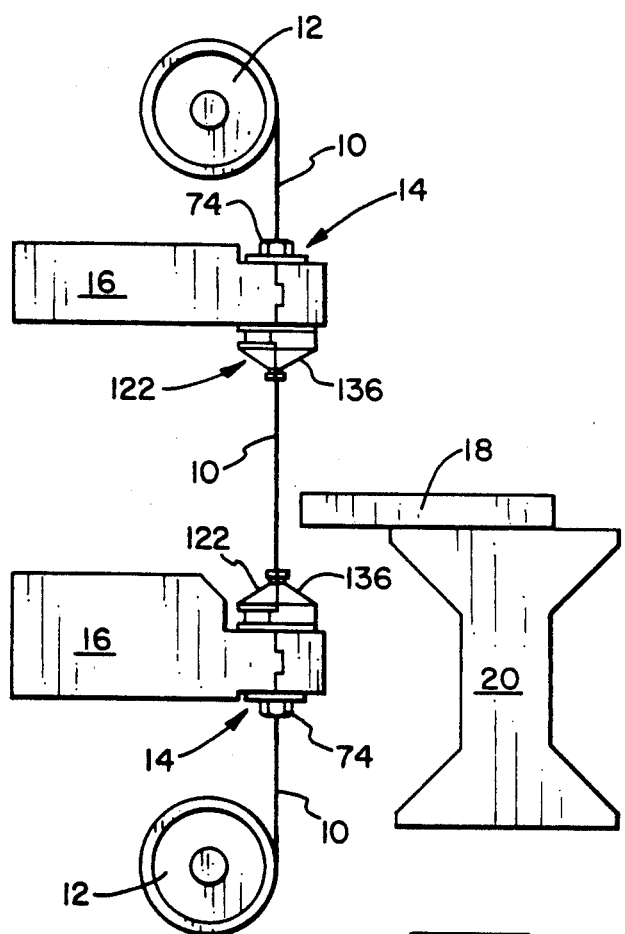
FIG. 1 is a diagrammatic side elevational view of an electrical discharge machine apparatus.

As shown in the drawings, a specific embodiment of the present invention is used in conjunction with electrical discharge machines. In general, as shown in FIG. 1, electrical discharge machines utilize a wire 10 wrapped around spools 12 and traveling therebetween. Cartridge assemblies generally indicated as 14 are mounted on the ends of arms 16 and, wire 10 is received through and guided by the cartridge assemblies 14. A workpiece 18 generally made of a conductive material is held on table 20 so that it may be cut or shaped by wire 10. More specifically, arms 16 and/or table 20 are manipulated so that wire 10 may travel through workpiece 18 cutting and shaping the same in a predetermined desired manner. The cutting and shaping of workpiece 18 is caused by the moving wire as it travels between spools 12 by the placement of a different potential on wire 10 and workpiece 18 causing a spark therebetween and, also, electroeroding workpiece 18 in the proximity of the traveling wire 10.

Figure 2:
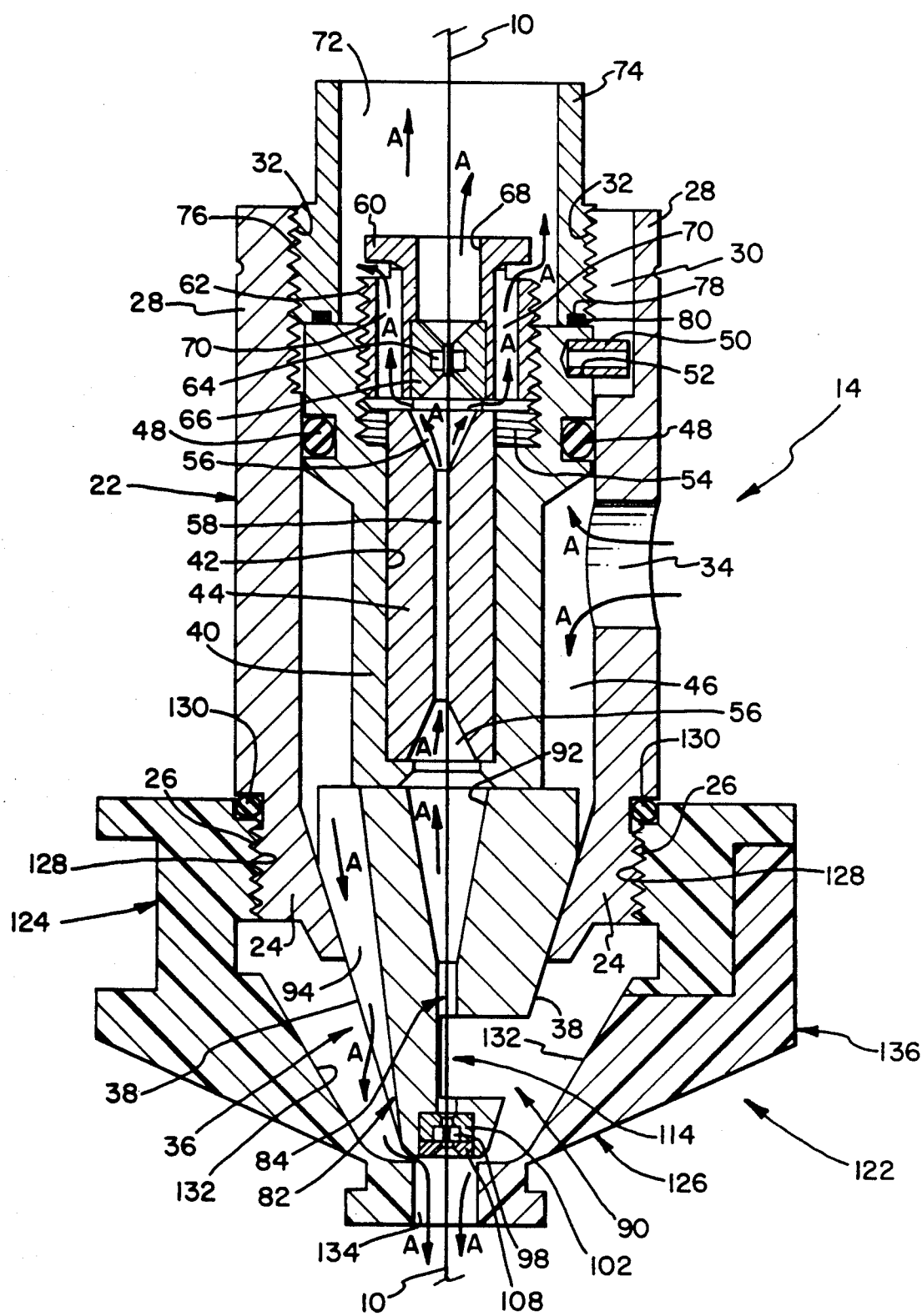
FIG. 2 is a cross-sectional side elevation view of a wire guiding assembly employing a wire guiding device according to the present invention.

Cartridge assemblies 14 are used to more accurately locate or place wire 10 with respect to workpiece 18, place a potential on wire 10 and, also, to flush and cool workpiece 18 with deionized water or the like. As shown in FIG. 2, cartridge assembly 14 includes a cartridge barrel 22 having a truncated converging conical lower portion 24. The inner surface of lower truncated conical portion 24 is smooth and converging while the exterior surface thereof has formed thereon threads 26. The upper cylindrical portion 28 of barrel 22 includes a longitudinal slot 30 and threads 32 on the inner surface thereof. Deionized water or liquid supply hole 34 is provided on the side of barrel 22.

A precision wire guiding device generally indicated as 36, more fully described in detail hereinbelow, is received within barrel 22 and extends out of truncated converging lower conical portion 24 of barrel 22. More specifically, outer conical surfaces 38 of device 36 rest against the inner truncated conical portion surface of portion 24 of barrel 22. Device 36 is situated substantially concentrically with respect to barrel 22.

A carbide holder 40 is received in barrel 22 above device 36 and has a bore 42. Bore 42 is situated non-concentrically with respect to carbide holder 40 and receives a carbide pickup 44 therein as shown. Carbide holder 40 has a reduced outer diameter forming an annular gap 46 between the inner surface of barrel 22 and the outer reduced diameter surface of carbide holder 40. O-ring 48 located between the inner surface of barrel 22 and the upper portion of carbide holder 40 forms a seal thereat and of annular gap 46. A roll spring element 50 is received in bore 52 located in the upper portion of carbide holer 40 and extends outwardly therefrom. Element 50 is slidingly received within longitudinal slot 30 of barrel 22 and acts to retain carbide holder 40 in an aligned radial relation with barrel 22. The upper portion of carbide holder 40 further includes an enlarged eccentric bore having threads 54 formed therein.

Carbide pickup 44 includes two truncated conical portions 56 leading and communicating with a longitudinal hole 58. Wire 10 makes contact with carbide pickup 44 and an electrical potential is placed on wire 10 by this contact through the carbide pickup 44.

Carbide pickup 44 is retained within bore 42 through the use of a preguide retaining nut 60 having threads 62 mating with threads 54 of carbide holder 40. Preguide retaining nut 60 includes a diamond preguide member 64 having a preguide hole therethrough and being mounted in a sintered metal preguide holder 66. Preguide holder 66 is received and fixed concentrically within a bore 68 of preguide retaining nut 60. Diamond preguide member 64 acts to situate wire 10 in close proximity to its final position and, also, to place wire 10 in contact with carbide pickup 44. Further, preguide retaining nut 60 includes longitudinal bores 70 in communication at one end thereof with truncated conical portion 56 and hole 58 of carbide pickup 44 and at the other end thereof with bore 72 of retaining nut 74.

Retaining nut 74 includes external threads 76 and an annular recess 78 for receiving therein O-ring 80. Threads 76 of retaining nut 74 mate with threads 32 of barrel 22 and retaining nut 74 is, thus, received within barrel 22 and bears against the upper portion of carbide holder 40 retaining the same within barrel 22. O-ring 80 provides a cushion retaining nut 74 and the upper portion of carbide holder 40.

Wire guiding device 36, more specifically, includes a body generally indicated as 82. A wire hole 84 extends through body 82 and includes a first opening 86 at one end of hole 84 and body 82 and a second opening 88 at the other end of hole 84 and body 82. A cavity or cavity means is provided in body 82 and communicates with hole 84 and is provided for obtaining access to wire hole 84 and for threading wire 10 through wire hole 84 and between openings 86 and 88. Towards the first opening 86, wire hole 84 includes a truncated conical portion 92 increasing in size towards first opening 86.

The exterior of wire guiding device 36 includes deionized water or liquid passage slots 94. Deionized water, under pressure within annular gap 46, travels out from within barrel 22 downwardly through passage slots 94 of device 36.

An enlarged bore portion 96 is provided at one end of wire hole 84 at second opening 88 thereof. A wear-resistant member 98, preferably made of diamond, has a hole 100 therethrough substantially coaxial with wire hole 84. Wear-resistant member 98 is fixed in insert 102 and insert 102 is, in turn, fixed within bore portion 96. Insert 102 is preferably made of a sintered metal material and acts to rigidly hold wear-resistant member 98 in position concentrically with wire hole 84. Wear-resistant member 98 and/or insert 102 include a truncated conical portion substantially coaxial with wire hole 84 and converging toward the wear-resistant member hole 100. In FIG. 4, a truncated conical portion 104 is shown in insert 102 and a truncated conical portion 106 is shown in wear-resistant member 98.

A non-conductive cap 108 is provided and fixed to body 82 within bore 96 and adjacent to insert 102 and wear-resistant member 98. Cap 108 includes a hole 110 and a truncated conical portion 112 both coaxial with the wire hole 84. Truncated conical portion 112 converges towards hole 110. Further, cap 108 is received substantially over insert 102 near second opening 88 of hole 84 and acts to shield device 36 and insert 102 along with wear-resistant member 98 from electroerosion.

Figure 3:
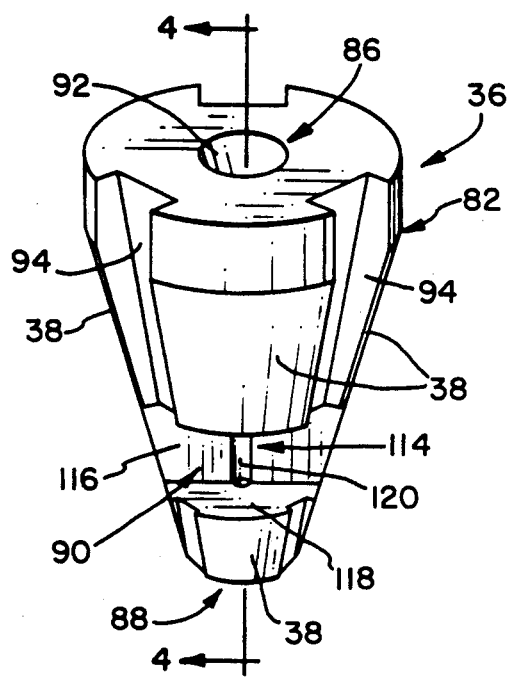
FIG. 3 is a perspective view of the wire guiding device shown in FIG. 2.
Figure 5:
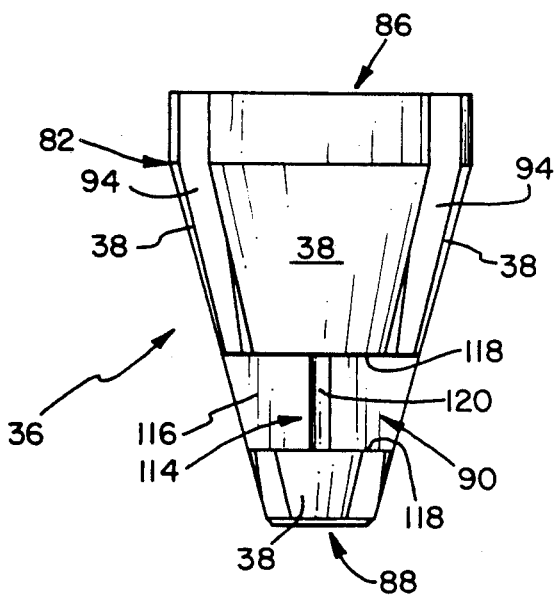
FIG. 5 is a front elevational view of the wire guiding device shown in FIG. 2.

As shown in FIGS. 2–4, wire hole 84 is substantially longitudinal and cylindrical and having a longitudinal axis defined by the line depicting wire 10. Further, cavity 90 in body 82 communicates with wire hole 84 along a longitudinal portion 114 of cylindrical wire hole 84. Cavity 90 is substantially channel-shaped running substantially perpendicular to wire hole 84 and includes a bottom valley portion 116 and two walls 118. Longitudinal communication portion 114 of the cylindrical wire hole 84 extends substantially on bottom valley portion 116. Bottom valley portion 116 is substantially planar as shown and wire hole 84 extends longitudinally substantially parallel to bottom planar valley 116. Wire hole 84 is intersected by planar valley 116 and forms the longitudinal communication portion 114 and, further, forms an elongate arcuate groove 120 on the planar valley portion 116 and in body 82. As more clearly shown in FIG. 4, elongate arcuate groove 120 is formed on one side of the longitudinal axis of wire hole 84. Preferably, when wire hole 84 is 0.060 inch elongate arcuate groove 120 extends upwardly from the bottom of the groove towards the longitudinal axis or wire 10 approximately 0.015 inch. Furthermore, preferably arcuate groove 120 is less than 180 degrees radially about the longitudinal axis.

A liquid retention chamber generally indicated as 122 is provided partially surrounding wire guide device 36 and threadably connected to lower conical portion 24 of barrel 22. Liquid retention chamber 122 has an upper generally cylindrical-shaped portion 124 and a lower conical-shaped portion 126. Threads 128 are formed on the inner surface of upper cylindrically-shaped portion 124 of retention chamber 122 and are adapted to mate with threads 26 of barrel 22. Accordingly, liquid retention chamber 122 is threadably attached to barrel 22 via threads 26 and 128, and an O-ring 130 is provided therebetween for creating a seal between liquid retention chamber 122 and barrel 22. Lower conical-shaped portion 126 of retention chamber 122 includes a truncated conical inner surface 132 converging generally downwardly toward discharge hole 134. Discharge hole 134 is coaxial with wire hole 84 and wire 10 is received therethrough. Furthermore, deionized water or another liquid is discharged through hole 134 from within liquid retention chamber 122.

Figure 6A:
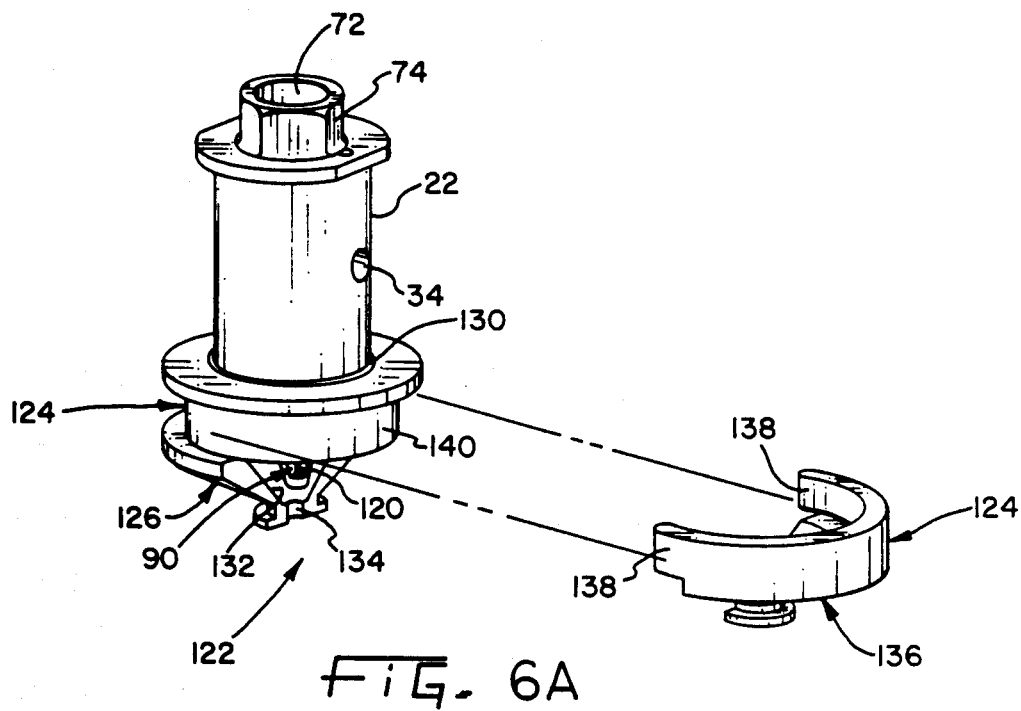
FIG. 6a is an exploded perspective view of the liquid retention chamber shown in FIG. 6 and in conjunction with the cartridge assembly and wire guiding device.

A door or door means generally indicated as 136 is provided in conjunction with liquid retention chamber 122 for opening chamber 122 and providing access to the interior of the chamber and to cavity 90 of wire guiding device 36. More specifically, door 136, as shown in FIGS. 6–8, is selectively detachably attached to and forms a part of the liquid retention chamber 122. Door 136 includes resilient snap action arms 138 integral with cylindrically-shaped portion 124 of door 136. Resilient snap action arms 138 are adapted to slip over cylindrical portion 140 and retain door 136 attached and forming a part of liquid retention chamber 122. More specifically, the inner surface of arms 138 are closer together than the diameter of cylindrical portion 140 and are resilient enough so as to snap over the greater diametric distance of cylindrical portion 140 and selectively be attached or detached therefrom.

In operation, the present invention is especially useful with small diameter wires 10, especially those smaller than 0.004 inch. As shown in FIG. 2, when threading wire 10 through cartridge assembly 14, wire 10 is first passed through the diamond preguide member 64 and, thereafter, through carbide pickup 44. Then wire 10 must be inserted through truncated conical portion 92 and wire hole 84 and, finally, through wear-resistant member hole 100 and out through the second opening 88 of device 36. As can be appreciated, because of the substantially thin wire 10, it is extremely difficult to thread wire lo as described because it does not have sufficient stiffness to travel the entire distance and, thereafter, be inserted through the wear-resistant member hole 100 which may be only 0.0002 inch larger in diameter than the wire 10 diameter.

Figure 9:
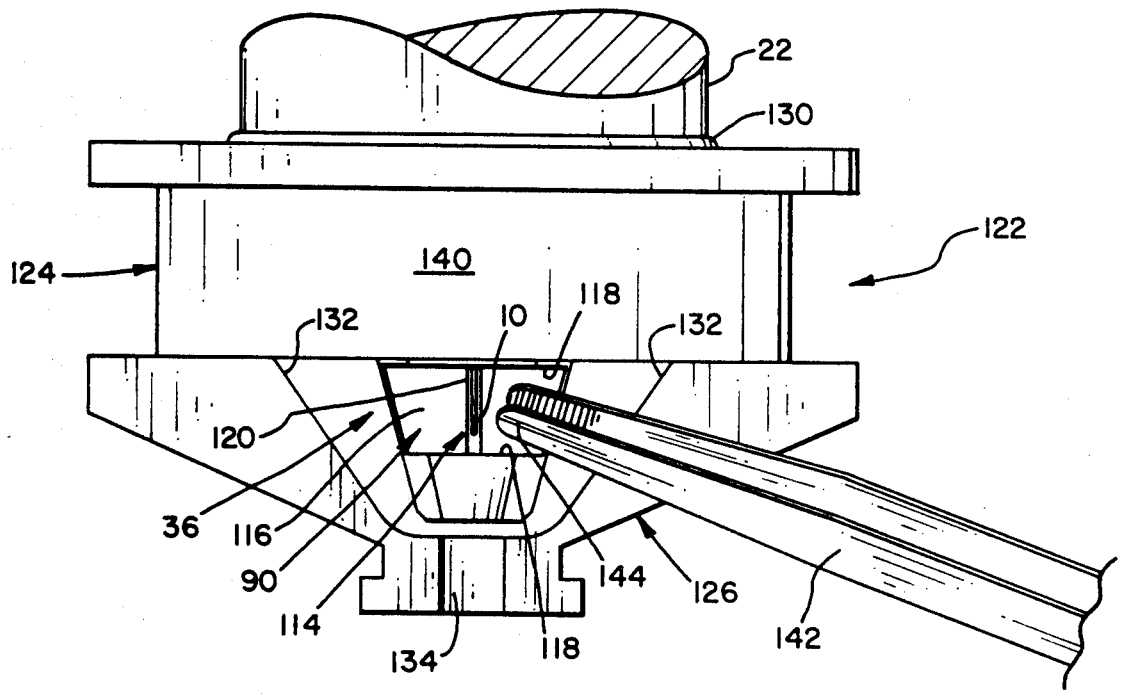
FIG. 9 is a front elevational view of the liquid retention chamber with the door thereof being detached and an operator's tweezers in position within the wire guiding device cavity for grasping and threading the wire.

Accordingly, in operation of the present invention, wire 10 is first pushed or threaded through diamond preguide member 64, carbide pickup 44 and, thereafter, wire 10 is inserted through first opening 86 of device 36 and through conical portion 92 and a portion of wire hole 84 to cavity 90. In general, this is done by merely pushing wire 10 through diamond preguide member 64 and allowing wire 10 to take the path thereof until cavity 90 is reached. Thereafter, as shown in FIG. 9, wire 10 is grasped with a pair of tweezers 142 and threaded the remaining distance through wire hole 84 and wear-resistant member hole 100 and out of the wire-guiding device 36 through the second opening 88 of the wire hole 84. When threading wire 10 with tweezers 142, elongate arcuate groove aids in the threading process by providing a locating reference or channel to funnel the wire 10 down and to the wear-resistant member hole 100. Furthermore, elongate arcuate groove 122 allows the operator to rest the tips 144 of tweezers 142 within groove 120 so as to help locate wire hole 84 and wear-resistant member hole 100 and slide wire 10 therethrough. Accordingly, wire 10 previously generally incapable of being threaded through cartridge assembly 14 and wire guiding device 36 because of its small diametric size and insufficient stiffness, is now easily threaded through the utilization of the present wire-guiding device 36 and without having to disassemble cartridge assembly 14.

Further yet, liquid retention chamber 122 need not be disconnected from cartridge assembly 14 during the threading operation. More specifically, door 136 may be detached from liquid retention chamber 122 gaining access to the wire guiding device 36 and cavity 90 wherethrough wire 10 may be grasped with tweezers 142 and threaded as described hereinabove. Thereafter, door 136 may be attached to the liquid retention chamber forming a part thereof and being ready for operation.

During operation of the electrical discharge machine and while wire 10 is traveling through cartridge assembly 14 and wire guiding device 36, deionized water or a liquid under pressure is supplied to assembly 14 through hole 34 as indicated by arrows A. Further, the deionized water travels throughout cartridge assembly 14 as indicated by arrows A cooling the same. More specifically, deionized water travels to within liquid retention chamber 122 through liquid passage slots 94 and, thereafter, upwardly within wire hole 84, conical portion 92, hole 58 of carbide pickup 44, and through diamond preguide member 64. It should be noted that the deionized water travels also through longitudinal bores 70 of preguide retaining nut 60, cooling the same, and moving gases formed within the carbide pickup 42 out therefrom and finally exiting through bore 72 of retaining nut 74. At the other end thereof, deionized water under pressure within liquid retention chamber 122 acts to cool wear-resistant member 98 and, further, by being discharged through hole 134 acts to flush workpiece 18 cleaning the same and moving the eroded particles of workpiece 18 away from the work cutting area.

The cartridge assembly 14 and wire guiding device 36 are preferably made of stainless steel. The liquid retention chamber 122 and door 136 thereof are preferably made of a plastic material.

While the invention has been described as having a specific embodiment, it will be understood that it is capable of further modifications. This application is, therefore, intended to cover any variations, uses, or adaptations of the invention following the general principles thereof and including such departure from the present disclosure as come within known or customary practice in the art to which this invention pertains and fall within the limits of the appended claims.

What is claimed is:

1. A method of threading a wire through a wire-guiding device of an electrical discharge machine including a body, a substantially longitudinal wire hole having a concentric longitudinal axis extending through the body, said wire hole having a first opening at one end and a second opening at the other end, and a cavity in the body in communication with the wire hole, said cavity being channel-shaped having a bottom valley planar portion and two walls, said valley planar portion being substantially parallel to and intersecting said wire hole on one side of said longitudinal axis and forming a groove on said valley planar portion with a depth of less than one-half the wire hole width, said method comprising the steps of:

inserting an end of the wire through the first opening of said wire hole and through a portion of the wire hole to the cavity communicating with the wire hole;

grasping the wire through the cavity; and threading the wire from the cavity through the remaining portion of the wire hole and out of the device through the second opening of said wire hole.

2. The method of claim 1 wherein said grasping and threading of the wire is done with tweezers.

3. The method of claim 1 further comprising:

prior to the step of inserting, the step of opening a liquid retention chamber at least partially surrounding the device for gaining access to the device and the cavity; and after the step of threading, the step of closing the liquid retention chamber.

4. The method of claim 3 wherein said grasping and threading of the wire is done with tweezers.

* * * * *

UNITED STATES PATENT AND TRADEMARK OFFICE
CERTIFICATE OF CORRECTION

PATENT NO. : 5,003,148

DATED : March 26, 1991

INVENTOR(S) : Thomas J. Truty et al.

It is certified that error appears in the above-identified patent and that said Letters Patent is hereby corrected as shown below:

Column 5, line 25, insert --between-- after "cushion".

Column 7, line 4, change "lo" to --10--.
Title Page:
In the abstract, line 2, after "(EDM)" insert --is provided--.

Signed and Sealed this

Twenty-seventh Day of October, 1992

Attest:

DOUGLAS B. COMER

*Attesting Officer*   Acting Commissioner of Patents and Trademarks